United States Patent
Barger

(10) Patent No.: US 7,284,431 B1
(45) Date of Patent: Oct. 23, 2007

(54) GEOPHONE

(75) Inventor: James E. Barger, Winchester, MA (US)

(73) Assignee: BBN Technologies Corp., Cambridge, MA (US)

(*) Notice: Subject to any disclaimer, the term of this patent is extended or adjusted under 35 U.S.C. 154(b) by 297 days.

(21) Appl. No.: 10/713,499

(22) Filed: Nov. 14, 2003

(51) Int. Cl.
G01P 15/125 (2006.01)
H04R 19/00 (2006.01)

(52) U.S. Cl. ............... 73/514.32; 73/514.06; 73/654; 367/181

(58) Field of Classification Search .......... 73/514.32, 73/654, 514.06, 784, 594; 367/178, 181
See application file for complete search history.

(56) References Cited

U.S. PATENT DOCUMENTS

| | | | |
|---|---|---|---|
| 2,200,097 A | 5/1940 | Phelps | |
| 2,307,792 A | 1/1943 | Hoover | |
| 2,325,424 A | 7/1943 | Rettinger | |
| 2,411,117 A * | 11/1946 | Scherbatskoy | 367/178 |
| 2,417,077 A | 3/1947 | Hoover | |
| 2,520,706 A | 8/1950 | Anderson et al. | |
| 2,645,123 A | 7/1953 | Hundstad | |
| 2,772,746 A | 12/1956 | Merten | |
| 3,067,404 A | 12/1962 | Hildebrandt | |
| 3,479,886 A * | 11/1969 | Canfield | 73/514.03 |
| 3,550,720 A | 12/1970 | Ballard | |
| 3,572,462 A | 3/1971 | Gray | |
| 3,953,829 A | 4/1976 | Boyle | |
| 3,992,951 A * | 11/1976 | Erspamer et al. | 73/497 |
| 4,020,919 A | 5/1977 | Broding | |
| 4,065,648 A | 12/1977 | Cvetko et al. | |
| 4,159,464 A | 6/1979 | Hall, Jr. | |
| 4,352,254 A * | 10/1982 | Peter et al. | 42/88 |
| 4,382,201 A * | 5/1983 | Trzaskos | 310/327 |
| 4,570,746 A | 2/1986 | Das et al. | |
| 4,600,077 A | 7/1986 | Drever | |
| 4,625,201 A * | 11/1986 | Berry | 340/636.13 |
| 4,625,827 A | 12/1986 | Barlett | |
| 4,692,912 A | 9/1987 | Mueller et al. | |
| 4,750,157 A | 6/1988 | Shei | |
| 4,764,908 A * | 8/1988 | Greer, Jr. | 367/178 |
| 4,899,845 A | 2/1990 | Bosco et al. | |

(Continued)

FOREIGN PATENT DOCUMENTS

JP 359217122 A 12/1984

OTHER PUBLICATIONS

Hoover, G.M. AND O'Brien, J.T., "The influence of the planted geophone on seismic land data," Geophysics, 45(8): 1239-1253 (Aug. 1980).

(Continued)

*Primary Examiner*—Hezron Williams
*Assistant Examiner*—Jacques M. Saint-Surin
(74) *Attorney, Agent, or Firm*—Fish & Neave IP Group Ropes & Gray LLP

(57) ABSTRACT

An improved system for sensing ground motion is provided. The system generally comprises a shell and a case within the shell and connected by a suspension. The mass of the case is greater than the mass of the shell. An electrode within the shell detects relative motion between the shell and the case.

47 Claims, 8 Drawing Sheets

U.S. PATENT DOCUMENTS

| | | | |
|---|---|---|---|
| 5,010,531 A | 4/1991 | McNeel | |
| 5,150,104 A * | 9/1992 | Thomas et al. | 33/366.19 |
| 5,231,252 A | 7/1993 | Sansone | |
| 5,288,955 A | 2/1994 | Staple et al. | |
| 5,339,292 A | 8/1994 | Brown et al. | |
| 5,343,744 A | 9/1994 | Ammann | |
| 5,398,035 A | 3/1995 | Densmore et al. | |
| 5,435,178 A | 7/1995 | Edwards | |
| 5,444,790 A | 8/1995 | Kogen | |
| 5,457,995 A * | 10/1995 | Staton et al. | 73/596 |
| 5,469,408 A | 11/1995 | Woo | |
| 5,473,702 A | 12/1995 | Yoshida et al. | |
| 5,477,506 A | 12/1995 | Allen | |
| 5,492,016 A * | 2/1996 | Pinto et al. | 73/724 |
| 5,684,756 A | 11/1997 | Schmitz et al. | |
| 5,808,243 A | 9/1998 | McCormick et al. | |
| 5,917,921 A | 6/1999 | Sasaki et al. | |
| 5,929,754 A * | 7/1999 | Park et al. | 340/439 |
| 5,978,317 A * | 11/1999 | Whitener | 367/178 |
| 5,996,411 A * | 12/1999 | Leonardson et al. | 73/514.29 |
| 6,393,913 B1 * | 5/2002 | Dyck et al. | 73/504.12 |
| 0,104,379 A1 | 8/2002 | Ried et al. | |
| 6,502,459 B1 | 1/2003 | Bonne et al. | |
| 6,507,790 B1 | 1/2003 | Radomski | |
| 6,538,612 B1 | 3/2003 | King | |
| 6,604,432 B1 * | 8/2003 | Hamblen et al. | 73/784 |
| 6,609,069 B2 | 8/2003 | Gysling | |
| 0,179,103 A1 | 9/2003 | Kamata | |
| 6,805,008 B2 * | 10/2004 | Selvakumar et al. | 73/504.14 |
| 6,854,330 B2 * | 2/2005 | Potter | 73/514.25 |
| 171,710 A1 | 8/2005 | Gysling et al. | |
| 6,935,458 B2 | 8/2005 | Owens | |
| 6,963,649 B2 | 11/2005 | Vaudrey et al. | |
| 6,978,673 B2 * | 12/2005 | Johnson et al. | 73/504.12 |
| 2002/0104379 A1 | 8/2002 | Ried et al. | |
| 2003/0179103 A1 | 9/2003 | Kamata | |
| 2005/0171710 A1 | 8/2005 | Gysling et al. | |
| 2006/0013425 A1 | 1/2006 | Kargus et al. | |

OTHER PUBLICATIONS

Krohn, Christine E., "Geophone ground coupling," Geophysics, 49(6): 722-731 (Jun. 1984).

Singh, V. et al., "Geophone ground coupling effect on reservoir mapping," 1998 SEG Expanded Abstracts.

Tan, T.H., "Short Note, Reciprocity theorem applied to the geophone-ground coupling problem," Geophysics, 52(12): 1715-1717 (1987).

BBN TECHNOLOGIES, CU-1091 Final Report, "Innovative Seismic System for Buried Unexploded Ordnance Detection and Classification," BBN Report No. 8313 (2001).

Shust et al, "Electronic Removal of Outdoor Microphone Wind Noise," Acoustical Society of America; Presented Oct. 13, 1998; Published Jan. 11, 2002.

Bleazey, John C., "Experimental Determination of the Effectiveness of Microphone Wind Screens," Journal of the Audio Engineering Society; 9:48-54; Jan. 1961.

Beranek, Leo L., "Acoustical Measurements," Published for the Acoustical Society of America by the American Institute of Physics, 1998 Editions, pp. 258-263.

* cited by examiner

GEOPHONE

This invention was made by an agency of the United States Government, or under contract with an agency of the United States Government. The name of the United States Government agency and the government contract number are: DARPA/SPO, Contract Number F33615-02-C-1262.

BACKGROUND OF THE INVENTION

1. Field of the Invention

This invention relates generally to improved geophones and other motion sensors. More specifically, this invention relates to a geophone or similar motion sensor that has improved coupling and is less sensitive to electrical noise.

2. Related Art

Typically, geophones comprise a heavy, rugged external case with a spike on the bottom that allows the geophone to be coupled to a reference surface, such as the ground. Within the external case is a mass that is relatively light with respect to the external case, sometimes referred to as a "proof mass." The proof mass is commonly coupled to the external case by means of a relatively soft spring. Thus, the external case moves with the ground or reference surface, but the proof mass generally does not move with the external case. This creates a relative motion between the proof mass and the external case. This relative motion is detected because the external case is generally magnetized and there is a coil within the proof mass in which current is induced by the movement of the proof mass through the magnetic field. In a typical application, the voltage within the coil is proportional to the relative velocity between the external case and the proof mass. This voltage can then be processed in order to determine the relative velocity.

Because the geophone senses the relative motion between the external case and the proof mass, an important factor in ensuring accurate measurements by a geophone or other ground motion sensor is to ensure that there is a sufficiently high quality of coupling between the geophone (and in particular, the external case) and the reference surface. It is desirable for the movement of the external case to track the movement of the reference surface as closely as possible.

Poor coupling can occur for various reasons. For example, when a geophone is disposed on the ground, the mass of the geophone and the compliant properties of the soil can affect the accuracy of motion measurements. This is because the top layer of the soil is influenced by the mass of the geophone and the motion of that layer with the geophone on top of it will differ from the movement of that layer in the absence of the geophone. Thus, the geophone will not accurately measure the motion of the reference surface, but only the motion of the reference surface as influenced by the geophone itself.

Because of these problems with coupling, many existing geophones cannot be deployed by simply throwing or dropping the device onto the ground or reference surface. In addition, most geophones are too delicate to maintain functionality when they are deployed in this way.

Thus, a need exists for a geophone or similar sensor that has improved coupling characteristics such that the geophone can be successfully deployed by simply throwing or dropping the geophone onto the reference surface. Moreover, it would be particularly desirable to have a geophone that is sufficiently rugged to maintain functionality after being deployed in this fashion. Finally, it would be desirable for such a geophone to have reduced electrical background noise such that it would be capable of detecting relatively weak ground motion signals.

SUMMARY OF THE INVENTION

An improved system for sensing ground motion is provided. The system generally comprises a shell, a case within the shell, and a suspension that connects the case and the shell. The mass of the case is greater than the mass of the shell, preferably by at least a factor of 2, and even more preferably by at least a factor of 10, or even greater. An electrode within the shell detects relative motion between the shell and the case. In one embodiment, the system is cylindrical in shape. The suspension between the shell and the case may comprise a closed cell foam that is preferably much stiffer in the radial direction than in the axial direction. Moreover, a fluid may be disposed between the shell and the case. This fluid preferably serves both to provide damping to the system, and to increase the capacitance between the electrode and the case.

In another embodiment of the present invention, a shell, a case within the shell, and a suspension coupling the shell and the case are provided. Once again, the mass of the case is greater than the mass of the shell, preferably by at least a factor of 2 and even more preferably by at least a factor of 10, or even greater. In this embodiment, two electrodes are provided—one attached to the shell and one attached to the case—wherein the relative motion between the two electrodes produces a signal. In this embodiment, the overall system is preferably cylindrical with a cone-shaped nose end. The cone-shaped nose preferably enhances the ability of the sensor apparatus to penetrate the ground so that the device could be deployed by simply dropping it from a height.

DETAILED DESCRIPTION OF THE PREFERRED EMBODIMENTS

Reference will now be made to the present preferred embodiments of the invention, examples of which are illustrated in the accompanying drawings.

Figure 1:
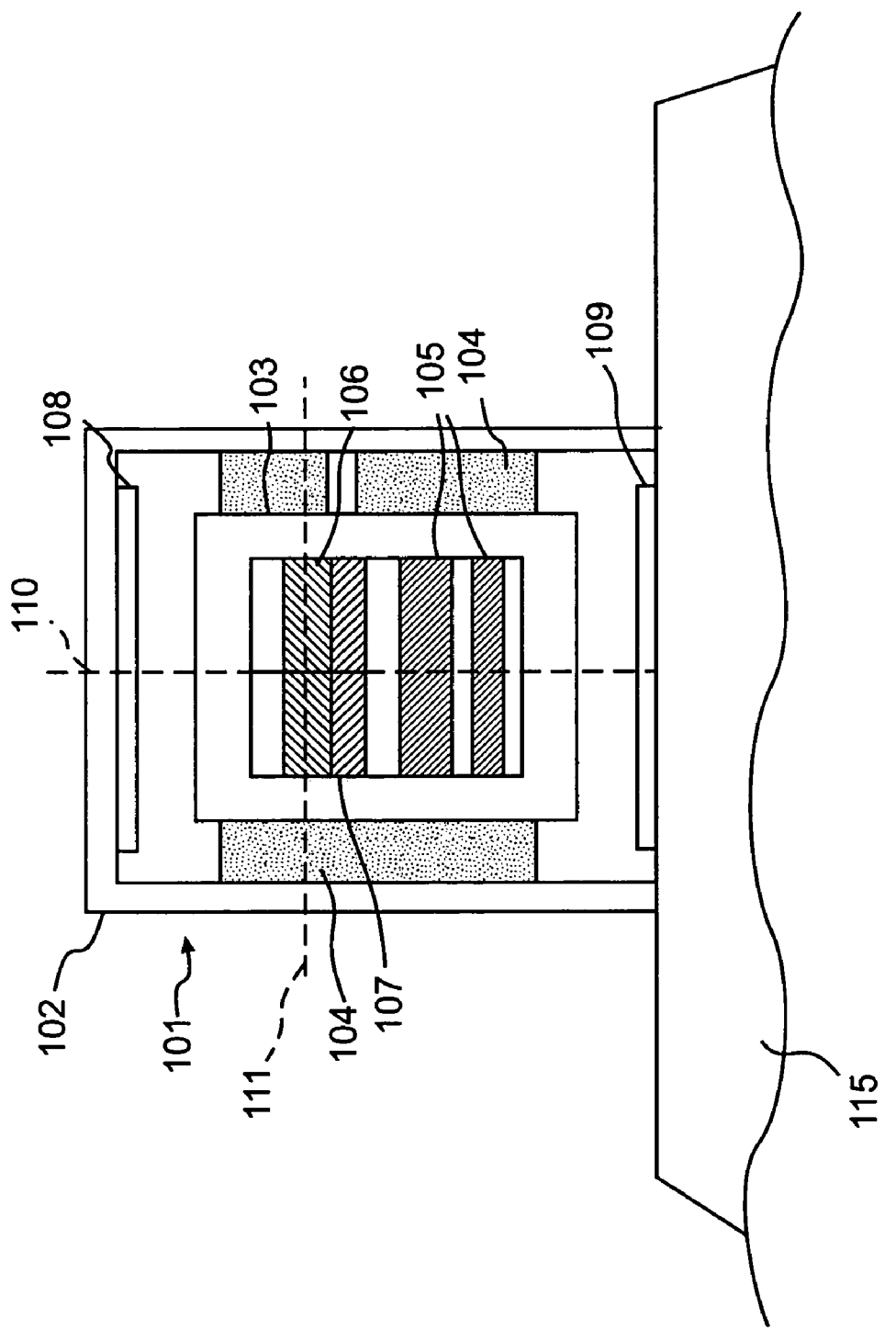
FIG. 1 depicts a cross-section of a sensor system according to an embodiment of the present invention.

FIG. 1 shows a cross-section of an embodiment of an improved geophone or other similar sensor according to the present invention. As shown FIG. 1, a sensor system 101 comprises a substantially cylindrical shell 102 and a case 103 enclosed within shell 102. Sensor system 101 is disposed on a reference surface 115, which may be the ground.

Shell 102 is preferably made from a light, tough material such as PVC. However, shell 102 may be made from a wide variety of materials that are preferably lighter than the material that makes up case 103. In a preferred embodiment, case 103 is at least 2 times greater in mass than shell 102, and even more preferably at least 10 times greater. In fact, as a general matter, the greater the mass difference between the case and the shell, the better the results that can be obtained using this invention. Case 103 is preferably made from tungsten. However, case 103 may be made from a variety of other materials, so long as it is heavier than shell 102. Between shell 102 and case 103 is suspension 104. Suspension 104 couples shell 102 to case 103 and is preferably a cylindrical jacket of closed-cell foam. In a preferred embodiment, this foam collar is about 100 times stiffer in the radial direction than in the axial direction. In FIG. 1, the radial direction is the horizontal direction, represented by dashed line 111; the axial direction is the vertical direction, represented by dashed line 110. The axial stiffness is adjusted so that the case 103 resonates in the axial direction at a desired low frequency cutoff.

The case 103 contains one or more batteries 105, charge amplifiers 106 and/or signal conditioning circuits 107. Metal foil electrodes 108 and 109 are fixed to the inside ends of shell 102. These electrodes are used for electrostatic sensing of relative axial motion between them and the case 103. The use of electrostatic signal transduction is preferred because it frees shell 102 from any transduction apparatus, apart from simply having a conducting surface. In this way, shell 102 needs only to function as a housing—keeping the remainder of the system from the weather etc. This is contrary to conventional geophones, which use magnetic transduction that requires magnetic iron parts to be attached to the external shell, thereby increasing its weight.

Electrostatic signal transduction also provides the device of FIG. 1 with relatively low background noise. Charge amplifiers 106 are used to amplify motion-induced signals, which may use capacitors in the source and feedback positions of an operational amplifier. In such systems, the noise of capacitors is negligible. Moreover, capacitors shunt the few necessary resistors, effectively reducing their noise as well.

In a preferred embodiment, the space between shell 102 and case 103 is filled with a fluid which has a high relative dielectric coefficient (K) and viscosity, such as ethylene glycol. Essentially, the relative dielectric coefficient is a measure of the dielectric characteristic of a fluid relative to vacuum (which has a relative dielectric coefficient of 1). A preferred relative dielectric coefficient would be approximately 2 (i.e., twice that of vacuum), and a particularly preferred relative dielectric coefficient would be above 78 (the relative dielectric coefficient of water). A preferred viscosity would be above 1.0 centipoise (1.0 centipoise is the viscosity of water at room temperature), and a particularly preferred viscosity would be greater than 10.0 centipoise. This fluid serves both to increase the capacitance of the sensing electrodes and also to damp the relative motion.

The embodiment described in FIG. 1 takes advantage of the principle of minimum unsprung weight. This principle, which derives from automotive applications, suggests that minimum motion-induced forces between the ground and a vehicle resting on it will be achieved by reducing the weight of the portion of the vehicle resting on the ground. However, to the knowledge of the present applicant, all existing geophones violate this principle. Thus, as described above, currently existing geophones comprise relatively heavy external shells which contact the reference surface, and enclose a relatively light proof mass, which is coupled to the external shell by a spring with low stiffness.

The present invention, however, has reversed this common arrangement. Thus, as shown in FIG. 1 and described above, a very light external shell (such as shell 102 in FIG. 1) is in contact with a reference surface and is mechanically connected to a relatively heavy internal case (such as case 103 in FIG. 1) by a centering spring (such as suspension 104) that has a relatively high stiffness in all directions except in the direction of ground motion being sensed. In general, ground motion may be sensed in either the vertical direction, which measures the up and down motion of the ground, or in the shear direction, which measures the side to side motion of the ground. The stiffness of the spring in the sensing direction is set to resonate with the internal case mass at the low frequency sensing cut off frequency. In this way, the heavy internal case is isolated from ground motion in the sensing direction at frequencies within the desired range, and the relative displacement between the external shell and internal case is equal to the ground motion displacement being sensed.

Figure 2:
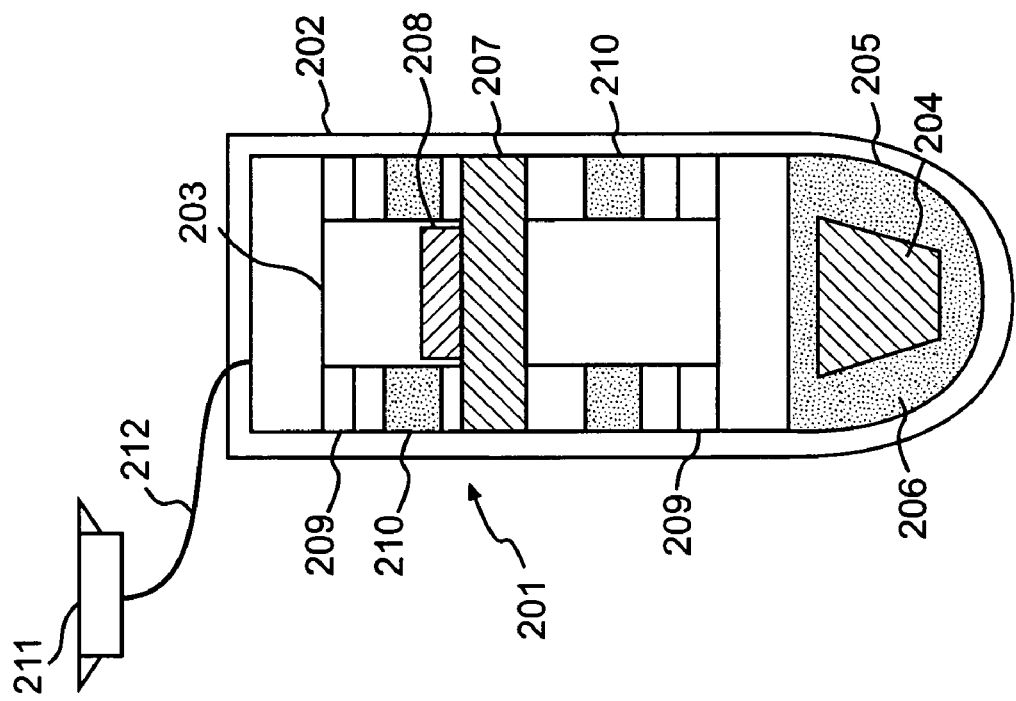
FIG. 2 depicts a cross-section of a sensor system according to another embodiment of the present invention.

A second embodiment of the present invention is shown in cross-section in FIG. 2. The embodiment shown in FIG. 2 is particularly well-suited for ground penetration by high-speed impact, such that the device may be dropped from a relatively high distance. In other words, the embodiment shown in FIG. 2 is particularly well-suited for "self-coupling" to the reference surface. As used herein, "self-coupling" refers to the ability of the geophone to couple to the reference surface when it has simply been dropped onto the surface without the need for it to be specifically planted into the ground by a human operator.

As shown in FIG. 2, sensor apparatus 201 comprises generally cylindrical external shell 202 and an internal case 203. As in the embodiment shown in FIG. 1, shell 202 is preferably constructed from a relatively light material such as PVC, while case 203 is preferably constructed from a relatively heavy material such as tungsten. Preferably, case 203 is at least 2-10 times heavier than shell 202, or even greater. Moreover, shell 202 and case 203, are coupled by means of a suspension 210. In a preferred embodiment, the device is made as thin as possible to promote penetration into the ground or other reference surface. Thus, the radius of the shell is preferably less than its height. Moreover, shell 202 may be provided with a nose cone 205 to further promote ground penetration.

One or more batteries 204 may be provided in the nose cone 205 of shell 202 in order to provide momentum at impact. However, a damper, such as foam 206 should be provided in nose cone 205 in order to isolate the mass of the batteries 204 to prevent their mass from affecting the dynamic shell mass.

Further, overlapping sensor electrodes 207 and 208 are attached to the inside wall of shell 202 and the outside wall of case 203 respectively. Relative axial motion (up and down) between the shell 202 and case 203 causes the degree of electrode overlap to change. This method of sensing relative motion is preferred in this embodiment to placing electrodes at the ends of the shell 202 (see, e.g., electrodes 108 and 109 in FIG. 1). This is because, with the minimized diameter of the shell 202, the capacitance of the end spaces will be low relative to electronic stray capacitance, and could cause some inaccuracies in measurements.

The space between shell 202 and case 203 is preferably filled with a fluid such as ethylene glycol to increase capacitance and to help damp out the initial impact. Moreover, one or more orifice rings 209 may be placed at the ends of case 203 to provide high fluid flow resistance at the large relative velocities of impact, but negligible resistance at the low signal relative velocities.

Finally, a radio 211 may be provided at the end of shell 202 opposite the nose cone 205. Radio 211 is preferably connected to the remainder of sensor apparatus 201 by means of a wire 212. Thus, when sensor apparatus 201 is disposed onto a reference surface, such as the earth's surface, and penetrates that surface, radio 211 is captured by the surface and is pulled free.

Figure 3:
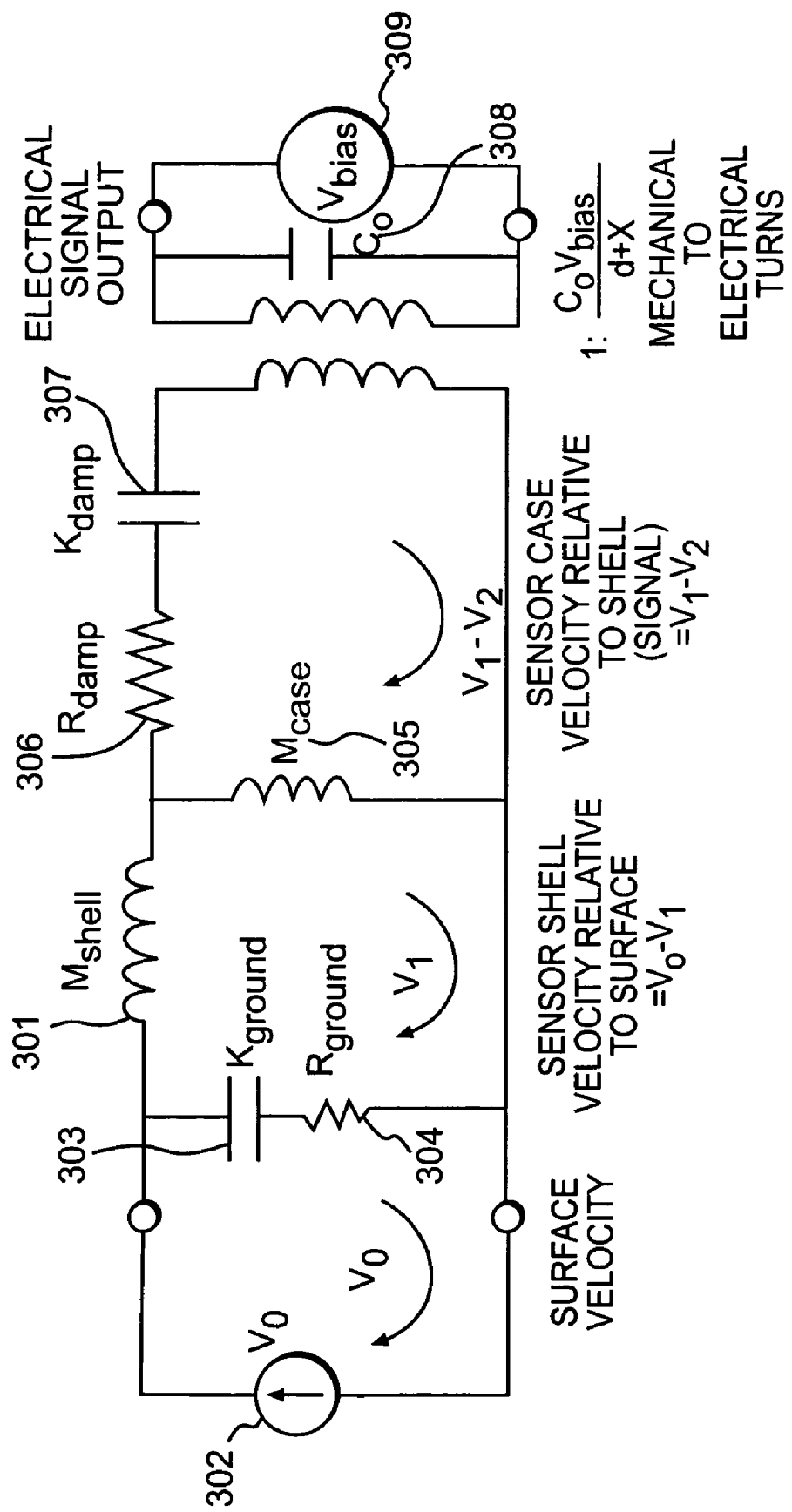
FIG. 3 depicts an electro-mechanical model of an embodiment of the present invention.

FIG. 3 represents an electro-mechanical circuit model of a preferred embodiment of the present invention in operation. The shell of mass $M_{shell}$ (represented as inductor 301) rests on earth moving with velocity $v_o$ (represented as current source 302) and having stiffness $k_{ground}$ (represented as capacitor 303) and resistance $R_{ground}$ (represented as resistor 304). The shell velocity is $v_1$, and it is reduced from the ground velocity by relative velocity between ground and shell $v_o - v_1$. It is preferable to minimize this "slip" velocity. The relative velocity between the shell (such as shell 102 of FIG. 1) and inside case (such as case 103 of FIG. 1) is $v_1 - v_2$. This is the velocity that appears across the sensor plates. The mechanical to electrical transduction ratio is equal to the sensor capacitance ($C_o$, represented by capacitor 308) multiplied by the bias voltage across the sensor plates ($v_{bias}$), divided by the gap between the plates (d+x). As would be evident to one skilled in the art from the electro-mechanical circuit, maximizing signal output voltage 309 requires that the shell mass (inductor 301) must be small and that the resonance frequency of the case mass (represented by inductor 305) and the damping spring (represented by resistor 306 and capacitor 307) must be lower than the signal frequency.

Now will be described in more detail a signal amplification system according to an embodiment of the present invention. In general, the signal source impedance of a preferred embodiment is capacitive, so that a charge amplifier (such as charge amplifier 106 in FIG. 1) will provide signal gain with the least noise addition. There are two preferred configurations. First, the sensor plates can be located at the amplifier source. Second, the sensor plates could be located in the feedback path.

Figure 4:
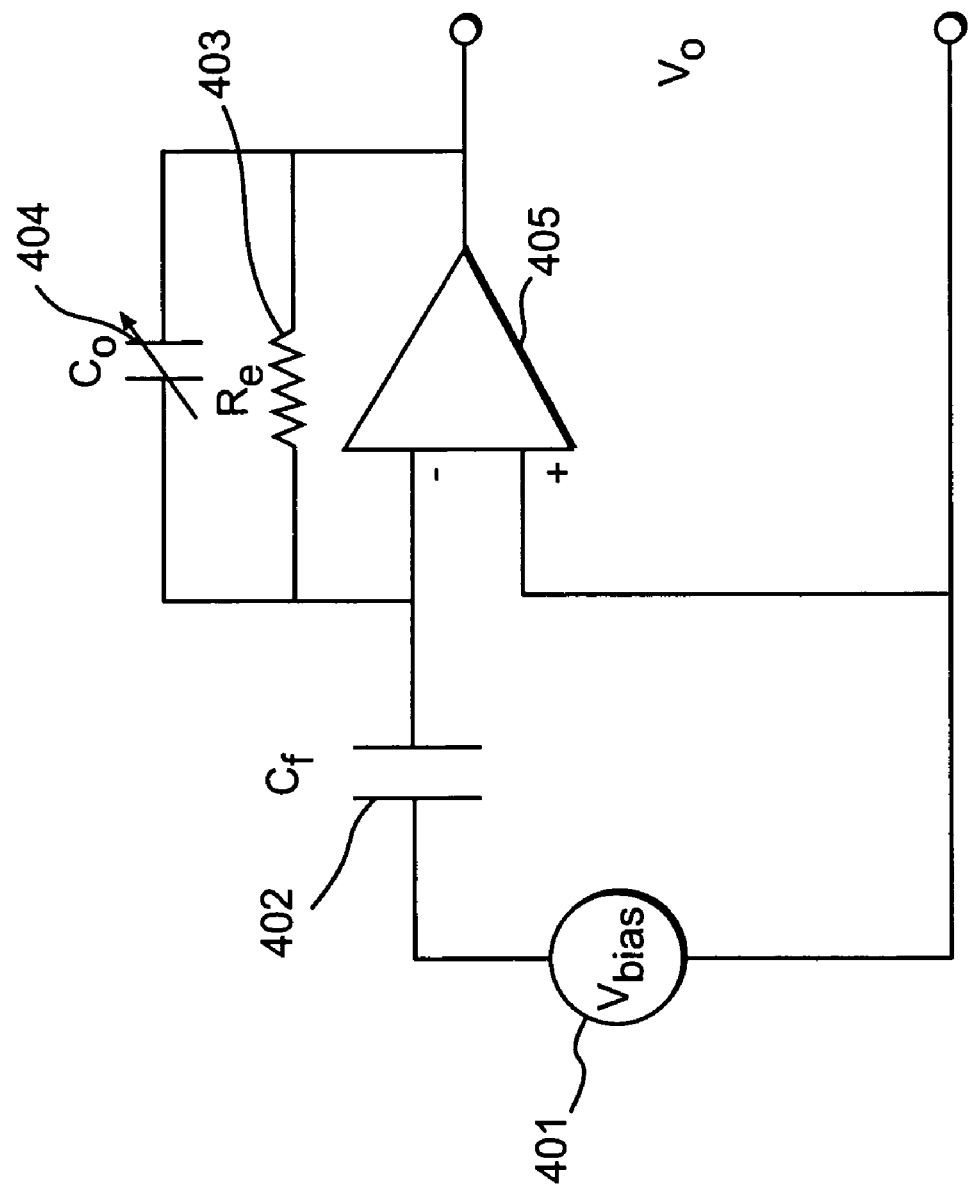
FIG. 4 depicts an amplifier circuit design according to an embodiment of the present invention.

The feedback path alternative is shown in FIG. 4. This arrangement makes the output voltage linear with the sensor plate separation. In general, in a particular system, there is a "static gap" between the sensor plates. For example, in FIG. 1, in a resting position, there is a certain gap between the case 103 and each electrode 108 or 109. This static gap may be represented by d. The additional distance between case 103 and each electrode 108 or 109 caused by the motion of the ground is x, and is referred to as a "signal gap," In general, d is much greater than x. Because static gap is much larger than the signal gap, this means that there is a large offset voltage on which the small signal voltage rides. If the bias voltage is steady (a battery), the offset voltage will not appear, because the amplifier 405 has no static gain, thereby solving the offset problem. The output voltage is proportional to the bias voltage, the ratio of fixed to sensor capacitances, and the ratio of signal displacement to gap. Thus, output voltage is given by the formula:

$$V_0 = V_{bias} \frac{C_f}{C_{eff}} \left(1 + \frac{x}{d}\right)$$

where $V_{bias}$ (401) is the DC voltage bias used to offset the voltage from the static gap and $C_f$ (402) is a fixed capacitance to be chosen by a system designer. $C_{eff}$, the effective capacitance created by the gap (static and signal) between the sensor plates, is given by the formula:

$$C_{eff} = C_0 \left(1 - \frac{i}{\omega C_0 R_e}\right)$$

where $\omega$ is frequency and $R_e$ (403) is the resistance in the feedback path. $C_o$ (404) is the capacitance of the plates, given by the standard formula for capacitance:

$$C_0 = \frac{\varepsilon_0 K_\varepsilon A}{d}$$

where $\varepsilon_o$ is permittivity, $K_\varepsilon$ is the relative dielectric coefficient of the fluid between the sensor plates, A is the area of the sensor plates, and d is the distance between the sensor plates. In general, a roll-off frequency occurs when $\omega C_o R_e$ is approximately equal to 1. In such cases, output voltage may be given by:

$$V_0(f) = V_{bias} \frac{C_f}{C_0} \frac{x(f)}{d}$$

The requirement of a bias voltage in this arrangement may cause problems in certain applications. In a practical system, there is a certain maximum amount of voltage that the amplifier can handle. Because of the requirement of a bias voltage in this arrangement, the amount of gain that the amplifier can apply is limited. This is because the use of the bias voltage limits the amount of gain. An alternative system that eliminates this problem is shown in FIG. 5.

Figure 5:
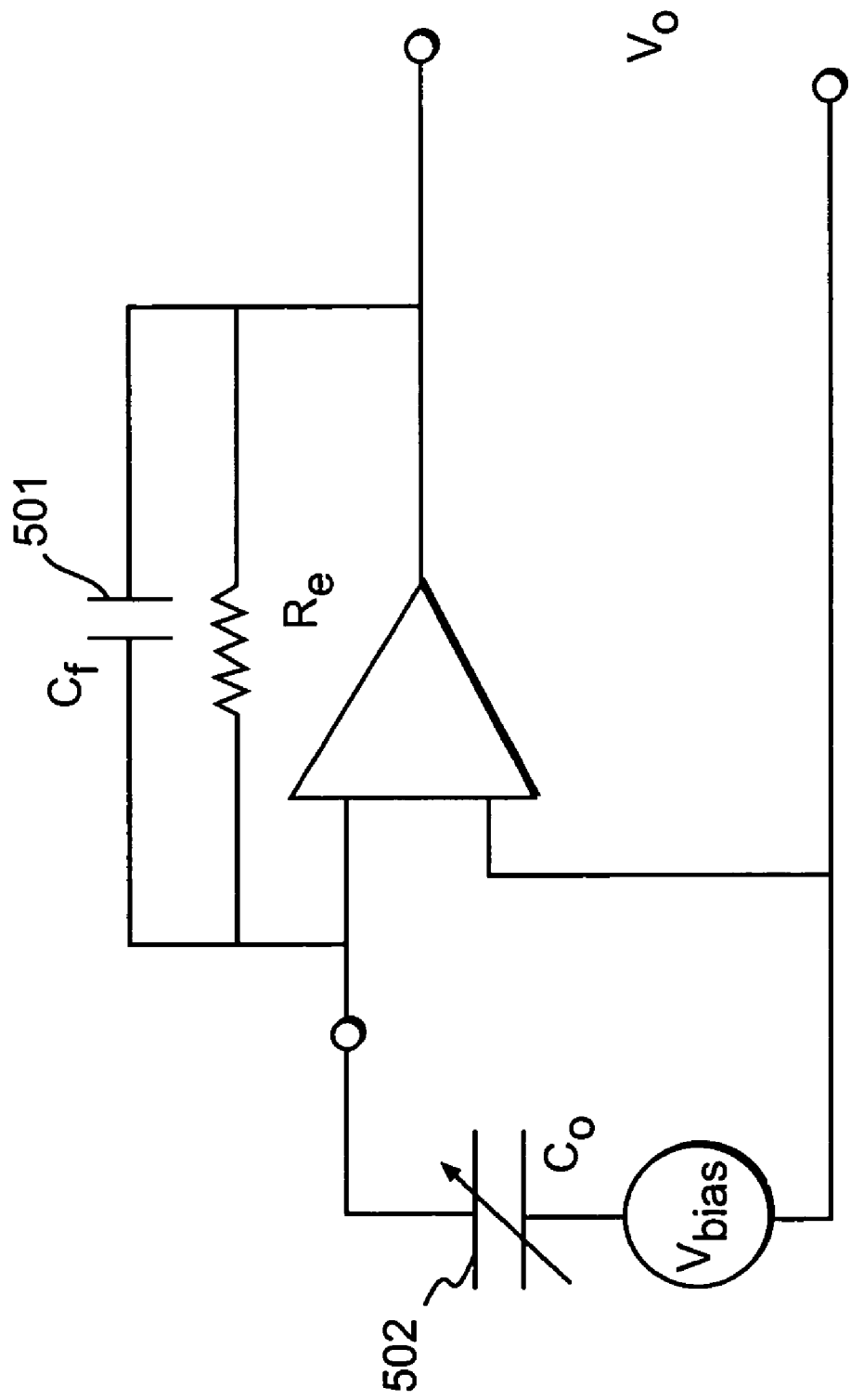
FIG. 5 depicts an alternative amplifier circuit design according to an embodiment of the present invention.

In the amplifier option shown in FIG. 5, the two capacitor positions ($C_o$ (502) and $C_f$ (501)) are reversed from their positions in FIG. 4. In this configuration, there is no offset proportional to the static gap, and the output voltage is the same as with the other configuration, except with the two capacitors reversed. The equation for output voltage is given by:

$$V_0(f) = V_{bias} \frac{C_0}{C_{eff}} \frac{x(f)}{d}$$

In this configuration, because there is no DC offset proportional to the static gap, the bias signal can be a high frequency carrier signal, rather than in the previous case where the bias had to be DC. This has the advantage of lower amplifier noise. However, the output signal must be amplitude demodulated to get the data signal. Various amplitude modulation techniques are known to those skilled in the art.

Now will be described in more detail the signal processing aspects of a preferred embodiment of the present invention, particularly as related to suspension "sag." In general, the rest position of an inner case according to an embodiment of the present invention (such as case 103 in FIG. 1) will change somewhat when the sensor is reoriented. This is because of sagging in the suspension spring. The offset capacitance caused by this gap and the distance of the sag is given by:

$$C_o = K_\varepsilon \varepsilon_o A/d, \text{ and}$$

$x_o = g/\omega_o^2$ where g is gravitational acceleration. Following these equations, the maximum sag ($x_o$) is 1.7 mm when the axis is vertical and the suspension system resonance frequency ($\omega_o$) is 12 Hz. In a system such as that described with respect to FIG. 1, the result of this sag is to increase the spacing between case 103 and the upper electrode 108. This decreases the sensitivity of the signal produced by the electrode 108. At the same time, the distance between case 103 and lower electrode 109 is decreased. To minimize the impact of this case offset problem, the outputs of the two charge amplifiers associated with the two electrodes are subtracted. The following formula represents this subtraction:

$$V_{left} - V_{right} = V_{bias} \frac{C_0}{C_f} \frac{x}{d+x_0} - V_{bias} \frac{C_0}{C_f} \frac{-x}{d-x_0} =$$

$$V_{bias} \frac{C_0}{C_f} \frac{2xd}{d^2-x_0^2} = 2V_{bias} \frac{C_0}{C_f} \frac{x}{d}\left(1 + \left(\frac{x_0}{d}\right)^2 + \left(\frac{x_0}{d}\right)^4 + ...\right)$$

The difference between the two is twice the signal voltage of either one, with a small correction for the sag-induced difference in the two gaps. For a static gap (d) of 5 mm, for example, the maximum sensitivity increase is a factor of 1.13, or 1 dB.

Figure 6B:
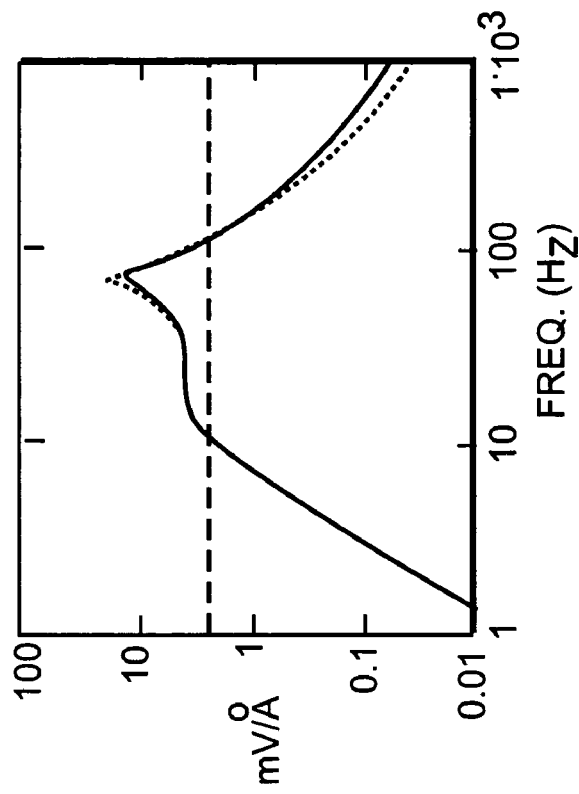
FIGS. 6A-B depict the performance of various ground sensor systems.
Figure 6A:
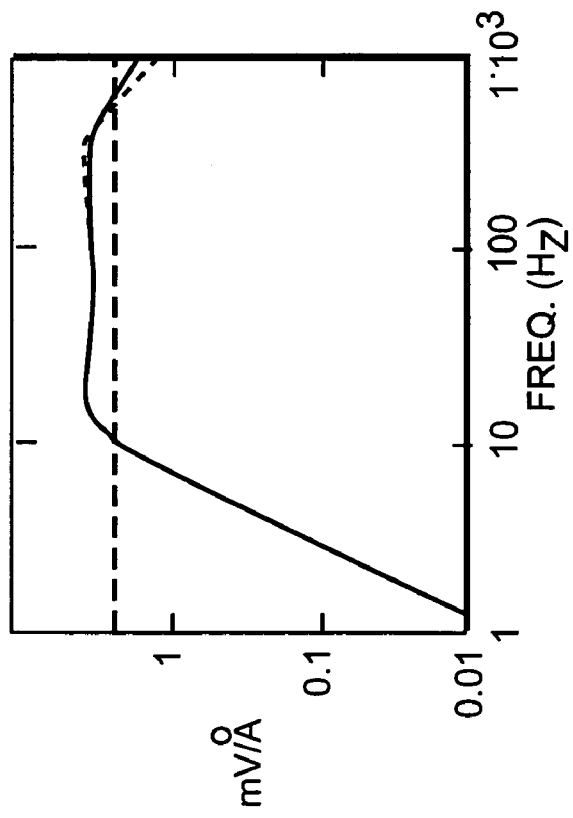

Signal sensitivity is also an important aspect of a preferred embodiment of the present invention. Two signal sensitivity curves are shown in FIGS. 6A-B. These curves show the displacement sensitivity (in millivolts per angstrom) of two geophones as a function of frequency. These curves were calculated using the differential equations implicit in the electro-mechanical network shown in FIG. 3 (with the equations used to calculate soil stiffness ($k_{ground}$) and resistance ($R_{ground}$) taken from F. E. Richart et al., Vibrations of Soils and Foundations, Prentice-Hall, Englewood Cliffs, N.J. 1970, the entirety of which is hereby incorporated herein by reference). The parameters used to calculate the curve in FIG. 6A are listed below:

Mass of Shell=8 g
Mass of Case=80 g
Diameter of Cylinder=25 mm
Cut-off Frequency=12 Hz
Static Gap=5 mm
Quality Factor=1
Ground Density=1800 kg/m³
Speed of Shear Wave in Ground=20 m/s
Poisson's Ratio of Ground=0.25
$C_f$=400 $C_o$
$V_{bias}$=200 V
$C_o$=33 pF
Re=400 MΩ

The geophone parameters listed above are representative of a preferred embodiment of the present invention. For the curve in FIG. 6B, the geophone parameters used were that of the commercially available HS-1 geophone (manufactured by GeoSpace Corporation).

The ground parameters used are representative of soft sand and are the same for both curves.

The curves in FIGS. 6A-B were calculated for a constant (in frequency) value of ground velocity $v_o$. The low-frequency cutoff frequency was 12 Hz in both cases. The curve FIG. 6A shows that at and above 12 Hz the sensor output is independent of frequency (as is the ground vibration) out to a frequency of about 800 Hz. This means that there is no slippage between the shell and the ground at frequencies lower than 800 Hz. In other words, the shell is perfectly coupled to the sand.

Curve 6B shows that the sensor output is independent of frequency (as is the ground vibration) only to about 40 Hz. The peak in the curve at about 70 Hz represents the mass of the HS-1 resonating with the ground stiffness. In other words, the shell is perfectly coupled to the sand only in a narrow frequency band. Moreover, the sensor output cuts off at about 90 Hz. It would be necessary to attach the HS-1 to a stake in the sand to end this slippage between its shell and the sand. (In both curves, the solid line is the measurement for ground motion in the vertical (up and down) direction; the dashed line is the measurement for ground motion in the horizontal (side to side direction)).

This comparison demonstrates the significance of reducing the weight of the external shell, as taught and described herein.

In addition to increasing the ground motion sensitivity, the embodiments of the present invention may also result in decreased noise over conventional geophones.

Figure 7A:
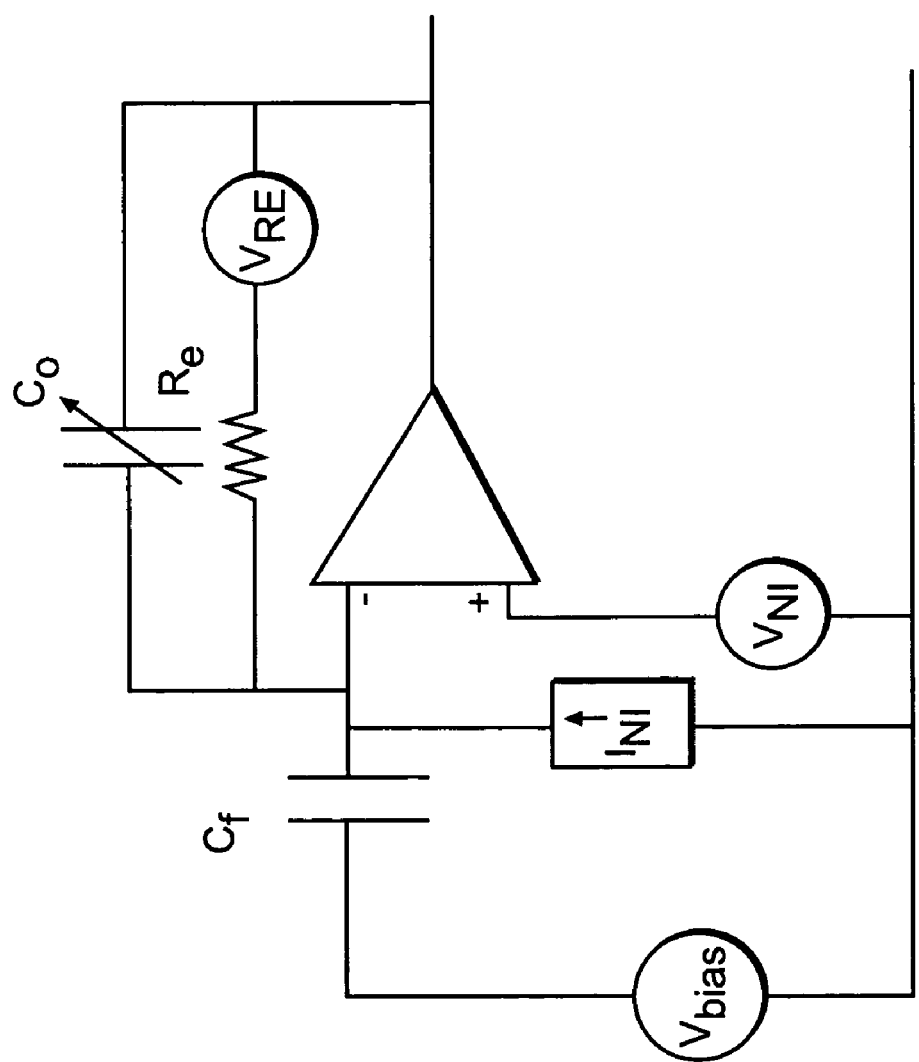
FIG. 7A depicts a circuit diagram of a noise power spectral density model.

Sensor noise for a charge amplifier in the configuration shown in FIG. 4 may be calculated using standard equations provided by the amplifier manufacturer. In this embodiment, the amplifier chosen for the calculation is a Burr-Brown (TI OPA655) low-noise operational amplifier. FIG. 7A shows a circuit diagram of a model for testing noise power spectral density. This is the same as FIG. 4 except for the addition of 3 noise generators as specified by the amplifier manufacturer.

The first noise source is the thermal noise spectrum of the resistor, denoted by $V_{RE}$. It is calculated as usual as $\sqrt{(4RkT)}$, where R is resistance of the resistor, k is the Boltzman constant, and T is the absolute temperature. The second noise source is the input current noise spectrum denoted by $I_{NI}$. The manufacturer gives this number as 1 fA/√Hz at f<1 kHz. The third noise source is input voltage noise spectrum is denoted by $V_{NI}$ and the manufacturer gives this number as 20 nV/√Hz at 100 Hz.

Figure 7B:
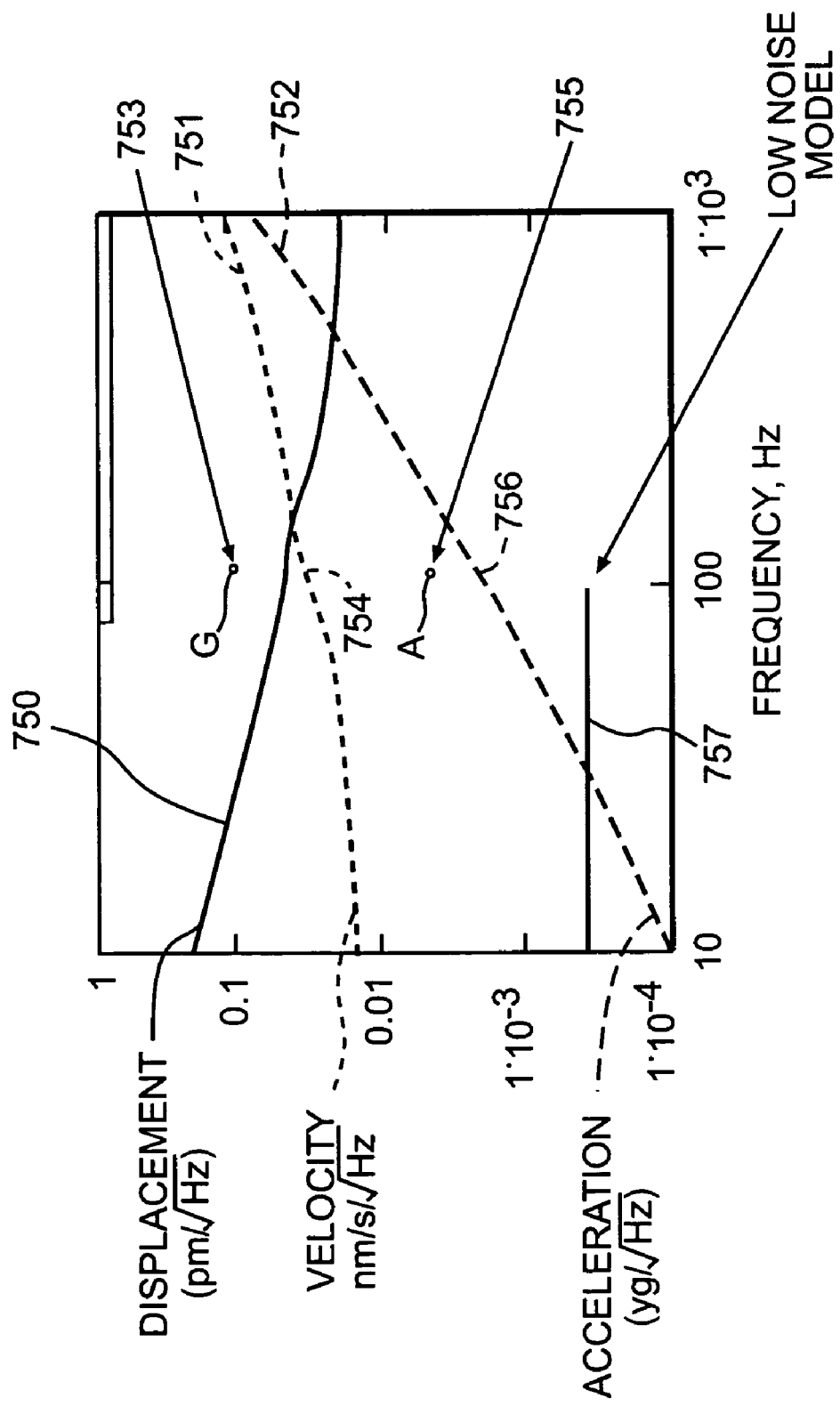
FIG. 7B depicts a diagram of noise power spectral density values.

FIG. 7B shows a diagram of the sensor noise power spectral densities calculated based on the following set of input parameters:

$V_{NI}$(100 Hz)=2 nV/√Hz $I_{NI}$(f<1 kHz)=1 fA/√Hz $V_{Re}=\sqrt{(4kTRe)}$ $G=C_f/C_o$ $R_e=4*10^8$ Ω

$C_o$=33 pF 4 kT=1.6*10⁻²⁰ at 20 deg. C.

FIG. 7B shows plots of the sensor noise power spectral densities for displacement (pm/√Hz) (curve 750), velocity (nm/s/√Hz) (curve 751), and acceleration (µg/µHz) (curve 752) for the preferred embodiment of the present invention described above. The curves of FIG. 7B were calculated from the equations implicit in the circuit diagram shown in FIG. 7A together with the noise parameters described above. FIG. 7B demonstrates that a geophone according to the present invention is quieter than other geophones.

For example, with respect to noise related to velocity measurements, also plotted on FIG. 7B (with the symbol 'G' at 753) is the measured velocity noise power spectral density value for the HS-1 geophone at the specific frequency of 100 Hz (data was not readily available for other frequencies). As can be seen in FIG. 7B, a comparison of the value of the velocity sensor noise power spectral density curve 751 at 100 HZ (point 754) with the measured velocity noise 753 reveals that the former is quieter by a factor of two at this frequency.

Also plotted on FIG. 7B (with the symbol 'A' at 755) is the measured acceleration noise power spectral density value for the Wilcoxon 731A accelerometer at 100 Hz (data was not readily available for other frequencies). Once again, the acceleration sensor noise power spectral density value (756) of an embodiment of the present invention is quieter by a factor of two at 100 Hz.

Also plotted on FIG. 7B (curve 757) is the acceleration noise power spectral density representing the lowest vertical seismic accelerations ever measured, according to the USGS "Low-Noise Model." Acceleration noise (curve 752) of an embodiment according to the present invention is comparable to this, indicating that noise is as low as practically necessary.

Thus, the noise output of the present invention is lower than other geophones for both velocity and acceleration measurements, and is comparable to the lowest seismic acceleration ever measured.

Although particular embodiments of the invention have been described and illustrated herein, it is recognized that modifications and variations may readily occur to those skilled in the art and consequently it is intended that the claims be interpreted to cover such modifications and equivalents.

The invention claimed is:

1. An apparatus for sensing motion of a referenced surface, comprising:
    a shell, a case within the shell, and a suspension;
    wherein the mass of the case is at least two times greater than the mass of the shell, and wherein the case is coupled to the shell with the suspension; and
    a first electrode coupled to the shell, wherein the first electrode is configured to detect relative motion between the first electrode and the case.
2. The apparatus of claim 1, wherein the shell is substantially cylindrical having an axial direction and a radial direction perpendicular to the axial direction.
3. The apparatus of claim 2, wherein the suspension comprises a closed cell foam.
4. The apparatus of claim 3, wherein the closed cell foam is about 100 times stiffer in the radial direction, than in the axial direction.
5. The apparatus of claim 3, wherein a stiffness of the closed cell foam in the axial direction is such that a resonance frequency of the case in the axial direction is at a low frequency cutoff.
6. The apparatus of claim 1, wherein the shell comprises polyvinyl chloride.
7. The apparatus of claim 1, wherein the case comprises tungsten.
8. The apparatus of claim 1, wherein the suspension comprises closed cell foam.
9. The apparatus of claim 8, wherein the closed cell foam is about 100 times stiffer in a radial direction than in an axial direction, wherein the radial direction is perpendicular to the axial direction.
10. The apparatus of claim 8, wherein a stiffness of the closed cell foam in an axial direction is such that a resonance frequency of the case in the axial direction is at a low frequency cutoff.
11. The apparatus of claim 1, further comprising: a battery disposed within the case.
12. The apparatus of claim 1, wherein the first electrode produces a signal responsive to a relative motion between the first electrode and the case.
13. The apparatus of claim 12, further comprising: a charger amplifier, wherein the charge amplifier amplifies the signal.
14. The apparatus of claim 1, wherein the first electrode comprises a metal foil.
15. The apparatus of claim 1, further comprising: a fluid disposed between the shell and the case.
16. The apparatus of claim 15, wherein the fluid has a relative dielectric coefficient greater than about 2.
17. The apparatus of claim 15, wherein the fluid has a relative dielectric coefficient greater than about 78.
18. The apparatus of claim 15, wherein the fluid has a viscosity greater than about 1.0 centipoise.
19. The apparatus of claim 15, wherein the fluid has a viscosity greater than about 10.0 centipoise.
20. The apparatus of claim 15, wherein the fluid is ethylene glycol.
21. The apparatus of claim 15, wherein the fluid increases a capacitance of the first electrode.
22. The apparatus of claim 15, wherein the fluid damps the relative motion between the case and the first electrode.
23. The apparatus of claim 1, further comprising a second electrode coupled to the shell.
24. The apparatus of claim 23, wherein the first electrode is positioned at a top of the shell and the second electrode is positioned at a bottom of the shell.
25. The apparatus of claim 1, wherein the first electrode functions by electrostatic signal transduction.
26. The apparatus of claim 1, wherein the mass of the case is at least ten times greater than the mass of the shell.
27. An apparatus for sensing motion of a reference surface, comprising:
    a shell, a case within the shell, and a suspension; wherein the mass of the case is at least two times greater than the mass of the shell, and wherein the case is coupled to the shell through the suspension;
    a first electrode coupled to the shell; and
    a second electrode coupled to the case;
    wherein the first and second electrodes are configured to move relative to each other, thereby producing a signal representing the relative motion between the first and second electrodes.
28. The apparatus of claim 27 wherein the shell is substantially cylindrical.
29. The apparatus of claim 28 wherein a radius of the shell is less than a height of the shell.
30. The apparatus of claim 29 further comprising: a cone shaped end.
31. The apparatus of claim 30 further comprising: a battery disposed in the cone shaped end.
32. The apparatus of claim 31 further comprising: a damper disposed between the battery and the shell, whereby a mass of the battery is isolated from a mass of the shell.
33. The apparatus of claim 27 further comprising: a fluid disposed between the shell and the case.
34. The apparatus of claim 33 wherein the fluid has a relative dielectric coefficient greater than about 2.
35. The apparatus of claim 33, wherein the fluid has a relative dielectric coefficient greater than about 78.
36. The apparatus of claim 33, wherein the fluid has a viscosity greater than about 1.0 centipoise.

37. The apparatus of claim 33, wherein the fluid has a viscosity greater than about 10.0 centipoise.

38. The apparatus of claim 33, wherein the fluid is ethylene glycol.

39. The apparatus of claim 33, wherein the fluid increases a capacitance of the first and second electrodes.

40. The apparatus of claim 33, wherein the fluid damps the relative motion between the case and the shell.

41. The apparatus of claim 33, further comprising: an orifice ring disposed between the shell and the case.

42. The apparatus of claim 41, wherein the orifice ring is configured to provide increasing fluid flow resistance as a relative velocity between the case and the shell increases.

43. The apparatus of claim 27, further comprises: a radio coupled to the shell.

44. The apparatus of claim 27, wherein the mass of the case is at least ten times greater than the mass of the shell.

45. A method for deploying a sensor apparatus, comprising:

disposing the sensor apparatus onto a reference surface whereby the sensor apparatus self-couples to the reference surface; wherein the sensor apparatus comprises, a shell, a case within the shell, and a suspension; wherein the mass of the case is at least two times greater than the mass of the shell, and wherein the case is coupled to the shell through the suspension;

and an electrode is coupled to the shell, wherein the electrode is configured to detect relative motion between the electrode and the case.

46. A method for deploying a sensor apparatus, comprising:

disposing the sensor apparatus onto a reference surface, whereby at least a portion of the sensor apparatus penetrates the reference surface thereby self-coupling to the reference surface; and wherein the sensor apparatus comprises, a shell, a case within the shell, and a suspension; wherein the mass of the case is at least two times greater than the mass of the shell, and wherein the case is coupled to the shell though the suspension;

a first electrode coupled to the shell; and a second electrode coupled to the case;

wherein the first and second electrodes are able to move relative to each other, thereby producing a signal representing the relative motion between the first and second electrodes.

47. The method of claim 46, wherein the senior apparatus further comprises a radio coupled to an end of the shell, and wherein the radio does not penetrate the reference surface.

* * * * *